Patented Aug. 7, 1945

2,381,342

UNITED STATES PATENT OFFICE 2,381,342

MANUFACTURE OF IMPROVED HULLED RICE

Max Frank Furter, Upper Montclair, N. J., assignor to Hoffmann-La Roche, Inc., Nutley, N. J., a corporation of New Jersey No Drawing. Application December 23, 1941, Serial No. 424,112

2 Claims. (Cl. 99—11)

My invention deals with the manufacture of a product from hulled rice by which each grain of such rice is provided with a coating or skin to carry ingredients which were lost by the hulling and are restored to the rice in this fashion and/or to carry fortifying ingredients not present in the hull of the natural grain.

My invention is particularly concerned with the manufacture of a greatly improved product from cleaned rice, which latter is of inferior nutritional value because it lacks the vitamin-carrying skin and germ components present in the natural brown rice of which components the brown rice has been deprived by the hulling process. I restore the vitamin component to the hulled rice by applying to the stripped rice grains a suitable coating into which said vitamin component is incorporated.

As far as I am aware, the art of applying a coating of the type here intended to the hulled rice is a novel one, and no prior attempts seem to have become known which have dealt with the particular problem of fixing a coating containing a restorative and/or fortifying ingredient to hulled rice.

As is well known, the cleaning of the crude rice is done by pounding the dry grains and separating off from the milled product the rice dust which consists of husks and of broken grains. Then the dull-white stripped material is polished in order to improve its appearance.

I have contemplated and tested various methods of fixing such a skin to the hulled rice grain. While a number of methods and materials should apparently be useful for the formation of the skin on the grain, I have found that in designing a technically feasible process the greatest difficulty is encountered when attempting to develop cheap, simple means to fix the skin on the grains in such a manner that the restorative and/or fortifying substance is distributed over their surfaces homogeneously, and that the appearance of the coated, dry rice is pleasing, each grain retaining its hard, compact, and polished structure. Where the added ingredient might be sensitive to heat and air, as, for instance, the vitamin B₁ present in the hulls of brown rice. I have also found it difficult to develop a fixing method and coating material which will permit the distribution of such sensitive substance over the grains in the necessarily finely divided form without substantial loss of the activity of the substance during the coating procedure, and to discover a skin-forming material in which such substance will remain stable for all practically required periods of time before consumption of the rice.

The objects of my invention are therefore twofold, namely, to determine the means which will accomplish the combination of these various requirements in an efficient manner well adaptable to the established working tools of the rice processing industry, and the improved cleaned rice itself which will possess all of the desired qualities.

I have discovered that these objects can be accomplished if the vitamin or any other desired ingredient is added to a polishing agent customarily employed for the polishing of stripped rice, and if the rice is then treated with this vitamin-charged polishing agent in the usual manner. The result is that the rice grains so treated retain their hard, compact surface structure which has a polished appearance, and contain the vitamin homogeneously distributed thereover.

In searching for a successful method of vitaminization, I have made the discovery which is surprising in view of the sensitivity of vitamin B₁ to heat and air, that it is possible to employ successfully the aqueous dextrin-glucose syrup customarily used for polishing as the carrier for the vitamin, and to apply the three ingredients combined in the polishing syrup to the grains by a dripping method.

It is well known that vitamin B₁ is readily destroyed by oxidation and exposure to continuous heating. The vitamin is soluble in sugar syrups, but it is of only very limited stability therein and is quickly decomposed, unless the syrup is absolutely pure and free from metals which, as is well known, catalyze the oxidation process. These requirements are, of course, not met by the commercially crude syrups for the polishing of rice, and the cost of specially purifying them for vitaminization would make the procedure unprofitable.

It was not to be expected, however, that an amount of vitamin B₁ sufficient for the vitaminization could be dissolved in the highly concentrated, glucose-dextrin saturated polishing solution at room temperature, and it was distinctly surprising to find that the vitamin is stable to oxidation in the crude, impure glucose-dextrin solvent medium as well as in the thin glucose-dextrin coating which remains on the surface of the grains after polishing and drying.

It is known also that the polishing process develops heat, as a result of which the temperature during polishing rises to from 40° to 60° C. and that this heat is distinctly "wet" due to the evaporation of water.

I have found that the vitamin $B_1$ does not suffer decomposition in the polishing syrup during the polishing procedure despite the fact that it is greatly exposed to the most damaging influences known to act adversely upon it, namely, "wet" heat in connection with extraordinary accessibility to oxidation as a result of the enormously fine subdivision of the vitamin-containing syrup over the surfaces of the rice grains. No losses in vitamin activity were noted either during or after vitaminization, and not even after a one year's storage of the rice before consumption.

That the conditions of the polishing procedure should be particularly favorable to destruction of the vitamin by heat is clearly evidenced by the enormously large subdivision of the polishing liquid during operation. By way of example, the simultaneous polishing and vitaminization of rice may be performed in such a way that about 100 kg. of rice are vigorously stirred in a large container provided with a double-flap stirrer and that the exceedingly small amount of only 350 ccm. of polishing liquid is added and finally subdivided in the rice during from five to ten minutes. It did not seem probable a priori that this small amount of vitamin (0.6 g. for 100 kg. of rice) present in the polishing liquid would be evenly distributed throughout the rice, and yet it was most surprisingly found that not only is the distribution very homogeneous over the entire surface of the grains, but that neither the heat developed by the polishing nor the exposure to oxidation has any noticeable injurious effect upon the vitamin. This was proved by a test in which from a charge of about 8000 kg. of vitaminized rice samples of only 100 g. were withdrawn intermittently and analyzed. It was found that differences in the vitamin content of 8 tons of rice and about 40 of such 100 g. samples were well within the limit of error of $\mp.5\%$ for the analytical method used.

The following examples illustrate my invention:

EXAMPLE 1

1000 cc. of a glucose-dextrin solution having the specific weight of 1.236=28° Baumé are charged into a 2 liter round flask and 1.200 gms. of vitamin $B_1$ are added. The mixture is strongly stirred for complete dissolution, accompanied, if necessary, by slight heating. The finished solution is immediately employed for the polishing and vitaminization of 200 kg. of stripped rice. The solution is allowed to drip within about 3 minutes onto the rice, which is vigorously stirred in the polishing vessel. The distribution is completed after further stirring for from 8 to 10 minutes and is then interrupted. The degree of vitaminization can now roughly be judged by examining the polished surface against the light. As soon as the rice shows a homogeneous shiny and smooth surface, it may be assumed that the homogeneous distribution of the vitamin has been accomplished.

EXAMPLE 2

24 g. of vitamin $B_1$ are dissolved in 500 cc. of water and this solution is homogeneously mixed with 19.5 liters of the ready made glucose-dextrin solution. For the purpose of vitaminization and polishing, 500 cc. of this solution are dropped onto charges of 100 kg. of rice in the manner described in Example 1. Under these conditions 4 tons of rice can be vitaminized to contain a vitamin $B_1$ content which is in the order of the vitamin $B_1$ content of the crude unstripped rice.

It will be observed from the foregoing descriptive matter and examples that the process may be practiced without special equipment, the frictional heat developed by the stirring of the rice being adequate to dry the solvent employed and to set the polishing film. As pointed out hereinbefore, it is an important feature of the instant process that the fortifying vitamin is distributed homogeneously over the surface of the rice, or adsorbed, rather than impregnated or absorbed within the body of the grain.

The following figures demonstrate the existence of the various surprising effects of my invention, such as the homogeneous distribution of the vitamin even in large-scale vitaminization, the stability of the finished product in storage, its resistance to mechanical influences, and the stability of the vitamin during cooking of the rice:

TABLE 1

Homogeneous distribution of vitamin in large-scale vitaminization 8470 kg. of rice were vitaminized between 10.20 a. m. and 7.30 p. m. Vitaminization was effected by adding 0.6 g. of vitamin $B_1$ to 500 cc. of glucose-dextrin polishing syrup, which quantity was applied to polishing individual batches of 110 kg. of rice. The average polishing time for 110 kg. of rice was ten minutes. From the polishing vessels, the vitaminized rice was transferred into a slowly rotating mixing drum with a capacity of about 1000 kg. of rice, in which the rice was mixed and dried after polishing. At the discharge end of this drum, a sample of 100 g. was drawn every ten minutes, until a total of 41 samples had been collected, and each sample was tested chemically and biologically for its vitamin $B_1$ content (Thiochrom- and Bradycardie-methods). The following table shows the results obtained from 16 samples. The intermediate samples had practically the same vitamin content. The first sample was not drawn until 11.45 a. m. since rice did not begin to leave the mixing drum until the latter had been sufficiently filled up.

| | Time of drawing sample | | | | | | | | | | | | | | | |
|---|---|---|---|---|---|---|---|---|---|---|---|---|---|---|---|---|
| | 11.45 a.m. | 12.23 p.m. | 12.45 p.m. | 1.19 p.m. | 1.52 p.m. | 2.25 p.m. | 2.48 p.m. | 3.21 p.m. | 3.54 p.m. | 4.27 p.m. | 5.03 p.m. | 5.36 p.m. | 6.00 p.m. | 6.29 p.m. | 7.00 p.m. | 7.33 p.m. |
| Found $B_1$ content in mg./kg. rice | 5.47 | 5.39 | 5.58 | 5.63 | 5.68 | 5.71 | 5.65 | 5.75 | 5.72 | 5.79 | 5.82 | 5.83 | 5.75 | 5.71 | 5.63 | 5.68 |

The theoretical vitamin content per kg. is calculated at 5.45 mg. vitamin $B_1$. It will be seen from the above data that during the entire day of the operation the distribution of the vitamin in the total amount of 8470 kg. of rice was surprisingly homogeneous. There is a slight increase during the day, probably due to the fact that a certain amount of the vitamin $B_1$ was retained on the walls of the polishing vessel at the commencement of the operation, and was then gradually discharged onto the rice during the day.

TABLE 2

Stability on storage

All samples obtained according to Table 1 were packed in paper bags, were stored without further precautions for a year at room temperature, and again tested. The measured minimum temperature of storage was 14° C. and the maximum temperature was 30° C. The following table shows only four out of forty-one actual tests since the remaining tests gave exactly the same picture:

| Sample (compare Table 1) | Analyzed in August, 1940, mg. $B_1$/kg. | Analyzed in September, 1941, mg. $B_1$/kg. |
|---|---|---|
| 11.45 | 5.47 | 5.7 |
| 3.54 | 5.72 | 5.6 |
| 5.36 | 5.83 | 5.4 |
| 6.29 | 5.71 | 5.9 |

It is apparent, therefore, that no loss of vitamin B was observed as a result of storage for one year. Discrepancies between the various results are within the limit of error of the testing method used.

TABLE 3

Mechanical influences

A mixed sample of 1 kg. of the vitaminized rice having a vitamin $B_1$ content of 5.5 to 5.7 mg. per kg. was strongly agitated for forty-eight hours in a glass bottle on a shaking machine. The resulting dust was carefully separated and the rice remaining on the sieve was again tested for its vitamin $B_1$ content. The amount of vitamin $B_1$ determined in four tests was on an average 5.4 to 5.5 mg. of aneurin per kg. of rice.

Despite this exposure to extremely strong friction to which the individual rice grains will never be submitted under practical shipping conditions, the vitamin-containing glucose-dextrin coating proved to be surprisingly stable.

TABLE 4

Stability of the vitamin during cooking of the rice 250 g. of rice containing an analytically determined vitamin $B_1$ content of 5.5 mg. per kg. were treated as follows:

30 g. of butter were melted in a pot of exactly predetermined weight, 4 g. of onions were steamed therein, and the unwashed rice and 604 g. of water and 15 g. of bouillon cubes were added while stirring strongly with gentle heating. The rice was then boiled for twenty minutes in the covered pot. Thereafter cooking was continued for ten more minutes with gentle heating. An excellent broth was obtained with softened but whole rice grains. In terms of weight the following proportions resulted:

The rice and additions had an initial weight of 903 g. This was reduced to 766 g. after boiling and cooling. Therefore, 137 g. of water were lost. The rice had absorbed 471 g. of water with swelling of the grains, and this corresponds to a water content of about 187%.

The boiled rice was dried in vacuo over phosphorous pentoxide. When the theoretically calculated dry weight had been reached after three days of drying, the residue was pulverized and the vitamin $B_1$ content determined chemically and biologically. Both methods gave concurrent results, namely, from 4.7 to 4.8 mg. of vitamin $B_1$ per kg. of rice. Therefore, the loss in vitamin $B_1$ as a result of the cooking in the above described manner amounts to about 15%.

Further similar tests in which the rice was prepared in slightly different manner confirmed the above results. The minimum loss of vitamin as the result of the cooking was 10% and the maximum loss was 22%. In view of these findings, it is necessary to add to the dextrin-glucose syrup for the vitaminization of hulled rice an excess of 20% of the vitamin $B_1$ quantity calculated to restore the natural vitamin content in order to compensate for the losses sustained during cooking.

Other methods of fixing a restorative and/or fortifying skin to the hulled rice grains have been found applicable. Thus, the vitamin can be applied to the polished rice by using water or alcohol as a solvent vehicle.

The aqueous solution of the vitamin can be sprayed onto the polished rice grains, which are carried in a thin layer on a moving conveyor belt, or the aqueous solution may be dripped onto the rice in the manner described in Example 1. While vitaminization is complete, care has to be taken that the spraying and drying is performed so that it does not affect the appearance of the polished rice by cracking the surface of the grains and dotting it with white spots.

Alcohol can be used, in which vitamin $B_1$ is difficultly soluble in the cold, provided that a high concentration of vitamin in respect to the alcohol content of the solution is employed. When spraying this solution upon the thin layer of grains carried by a moving conveyor belt, the distribution of the vitamin over the polished surfaces is quite even and the vitaminized rice has a good appearance after drying, but the spraying has to be done very carefully in order to avoid loss of the alcoholic vitamin solution by dissipation of the fine droplets before they reach the grains. The alcoholic solution may, of course, also be dripped onto the rice as described in Example 1.

Other modifications are to spray an aqueous vitamin-containing solution of dextrin or of glucose upon the stripped unpolished or polished rice, whereby care has to be taken that the drying does not affect the appearance of the grains in the manner mentioned above when spraying aqueous vitamin solutions upon polished rice. Here again the dripping method is also feasible.

The above described methods can be employed to fix other ingredients upon the hulled rice grains, such as water soluble vitamins, as, for instance, vitamin C, vitamin $B_2$, nicotinic acid, nicotinic acid amide, pantothenic acid, pyridoxine, biotine, p-amino benzoic acid, and other water soluble vitamins or vitamin-like substances, or other water soluble ingredients of nutrient or medicament character, such as iron salts, bromides, calcium salts, hormones or vitamin or hormone-containing extracts; or alcohol soluble vitamins, such as, for instance, vitamin A, vitamin D, vitamin E or vitamin-like substances, or hormones, or vitamin or hormone-containing extracts. Also dyestuffs may be incorporated to improve the appearance of the finished rice grain or to serve for identification purposes. Also suitable mixtures of the above identified water and/or alcohol soluble ingredients can be employed.

What I claim is:

1. A method of improving hulled rice which comprises vigorously stirring the rice, admixing thereto a solution of vitamin $B_1$ and a water-soluble, film-forming substance, and continuing the stirring until the solvent is dried by the frictional heat developed by the stirring and formation of a film on the rice grains is complete, whereby the vitamin is homogeneously distributed on the surface of the rice, and the grains are encased in a coating of the film-forming substance.

2. A method of improving hulled rice set forth in claim 1, in which the film-forming, water-soluble substance is glucose-dextrin.

MAX FRANK FURTER.